(12) United States Patent
Song et al.

(10) Patent No.: US 10,997,911 B2
(45) Date of Patent: May 4, 2021

(54) PIXEL DRIVING CIRCUIT, PIXEL STRUCTURE AND MANUFACTURING METHOD THEREOF

(71) Applicant: Kunshan Go-Visionox Opto-Electronics Co., Ltd., Kunshan (CN)

(72) Inventors: Yanqin Song, Kunshan (CN); Jiuzhan Zhang, Kunshan (CN)

(73) Assignee: KunShan Go-Visionox Opto-Electronics Co., Ltd., Kunshan (CN)

(*) Notice: Subject to any disclaimer, the term of this patent is extended or adjusted under 35 U.S.C. 154(b) by 0 days.

(21) Appl. No.: 16/257,686

(22) Filed: Jan. 25, 2019

(65) Prior Publication Data

US 2019/0156744 A1    May 23, 2019

Related U.S. Application Data

(63) Continuation of application No. PCT/CN2018/084880, filed on Apr. 27, 2018.

(30) Foreign Application Priority Data

Aug. 29, 2017    (CN) .......................... 201710760472.0

(51) Int. Cl.
  *G09G 3/3233*    (2016.01)
  *G09G 3/3266*    (2016.01)
  (Continued)

(52) U.S. Cl.
  CPC ........... *G09G 3/3233* (2013.01); *G02F 1/133* (2013.01); *G09G 3/3266* (2013.01);
  (Continued)

(58) Field of Classification Search
  CPC .. G09G 3/3233; G09G 3/3266; G09G 3/3275; G09G 2320/0209;
  (Continued)

(56) References Cited

U.S. PATENT DOCUMENTS

| 6,628,355 B1 | 9/2003 | Takahara |
| 2003/0111966 A1 | 6/2003 | Mikami et al. |

(Continued)

FOREIGN PATENT DOCUMENTS

| CN | 1405748 A | 3/2003 |
| CN | 1841664 A | 10/2006 |

(Continued)

OTHER PUBLICATIONS

European Search Report for Application No. 18852156.1 dated Aug. 3, 2020.

(Continued)

*Primary Examiner* — Abhishek Sarma

(57) ABSTRACT

The disclosure provides a pixel driving circuit suitable for high pixel density. The pixel driving circuit includes a switching transistor, the switching transistor adopts a dual gate field effect transistors, the dual gate field effect transistors includes a first gate electrode and a second gate electrode, and the first gate and the second gate are connected to the same scan line. The present disclosure also includes a pixel structure and a manufacture method thereof suitable for high pixel density.

3 Claims, 3 Drawing Sheets

(51) Int. Cl.
*G09G 3/3275* (2016.01)
*G02F 1/133* (2006.01)

(52) U.S. Cl.
CPC ... *G09G 3/3275* (2013.01); *G09G 2300/0426* (2013.01); *G09G 2300/0465* (2013.01); *G09G 2300/0809* (2013.01); *G09G 2320/0209* (2013.01)

(58) Field of Classification Search
CPC ... G09G 2300/0426; G09G 2300/0809; G09G 2300/0465; G09G 3/32; G02F 1/133
See application file for complete search history.

(56) References Cited

U.S. PATENT DOCUMENTS

| | | | |
|---|---|---|---|
| 2004/0253780 | A1 | 12/2004 | Cho et al. |
| 2009/0072226 | A1* | 3/2009 | Koo ............... H01L 27/3272 257/40 |
| 2013/0157399 | A1* | 6/2013 | Park ............... H01L 51/0001 438/34 |
| 2015/0379930 | A1 | 12/2015 | Lee et al. |
| 2016/0321992 | A1 | 11/2016 | Kim et al. |

FOREIGN PATENT DOCUMENTS

| | | |
|---|---|---|
| CN | 101398582 A | 4/2009 |
| CN | 202307893 U | 7/2012 |
| CN | 103227204 A | 7/2013 |
| CN | 103236245 A | 8/2013 |
| CN | 103293798 | 9/2013 |
| CN | 104424880 A | 3/2015 |
| CN | 104464607 A | 3/2015 |
| CN | 105280141 A | 1/2016 |
| CN | 105633103 A | 6/2016 |
| CN | 103246117 B | 9/2016 |
| CN | 105932032 A | 9/2016 |
| CN | 106157880 A | 11/2016 |
| CN | 106558287 A | 4/2017 |
| CN | 106910468 A | 6/2017 |
| CN | 106935201 A | 7/2017 |
| CN | 103293798 B | 8/2017 |
| JP | 2008-042043 A | 2/2008 |
| JP | 2010-210905 A | 9/2010 |
| JP | 2011022414 A | 2/2011 |
| JP | 2011-215638 A | 10/2011 |
| JP | 2013-019955 A | 1/2013 |
| JP | 2014-041366 A | 3/2014 |
| KR | 100260009 A | 6/2000 |
| TW | 392352 B | 6/2000 |
| TW | 533327 B | 5/2003 |
| TW | 200703651 A | 1/2007 |
| WO | 2008130195 A1 | 10/2008 |
| WO | 2011064819 A1 | 6/2011 |

OTHER PUBLICATIONS

Korean First Office Action for CN Application No. 10-2019-7021566 dated Apr. 27, 2020.
PCT Written Opinion of PCT/CN2018/084880 dated Aug. 1, 2018.
Chinese First Office Action for CN Application No. 201710760472.0 dated Dec. 4, 2019.
Taiwan First Office Action for Application No. 107117890 dated Apr. 2, 2019.
PCT International Search Report dated Aug. 1, 2018 in International Application No. PCT/CN2018/084880, Includes English Translation. 7 pages.
Japanese First Office Action for Application No. 2019-542632 dated Sep. 8, 2020.
Japanese Decision of Rejection Appeal for Application No. 2019-542632 dated Jan. 26, 2021.

* cited by examiner

PIXEL DRIVING CIRCUIT, PIXEL STRUCTURE AND MANUFACTURING METHOD THEREOF

CROSS-REFERENCE TO RELATED APPLICATIONS

This application is a continuation of International Application No. PCT/CN2018/084880, filed on Apr. 27, 2018, which claims priority to Chinese Patent Application No. 2017107604720, filed on Aug. 29, 2017. The disclosures of the aforementioned applications are hereby incorporated by reference in their entireties.

TECHNICAL FIELD

The present disclosure relates to the field of display screen display technology, and particularly to a pixel driving circuit, a pixel structure, and a manufacturing method thereof suitable for high pixel density.

BACKGROUND

With the development of Virtual Reality (VR) technology, a requirement on the Pixel Per Inch (PPI) of a display panel has also gradually increased. A pixel (or a sub-pixel) is usually composed of a transistor driving circuit and a luminescent material, and the size of the transistor driving circuit needs to be further reduced in order to increase the PPI.

SUMMARY

In view of the above, the embodiments of the present disclosure provide a pixel driving circuit, a pixel structure, and a pixel manufacturing method which are suitable for high pixel density, to solve technical problems that a pixel of an existing panel is affected by a pixel driving circuit and the pixel density is too low.

A pixel driving circuit suitable for high pixel density of the present disclosure includes a switching transistor comprising a dual gate field effect transistor. The dual gate field effect transistor includes a first gate electrode and a second gate electrode, and the first gate electrode and the second gate electrode are connected to a same scan line.

In an embodiment of the disclosure, an input end of the switching transistor is a source electrode, and an output end of the switching transistor is a drain electrode.

In an embodiment of the disclosure, the first gate electrode and the second gate electrode are of a top gate type, or the first gate electrode and the second gate electrode are of a bottom gate type, or the first gate electrode is of a top gate type and the second gate electrode is of a bottom gate type, or the first gate electrode is of a bottom gate type and the second gate electrode is of a top gate type.

A pixel structure suitable for high pixel density of the present disclosure includes a first pixel and a second pixel adjacent to the first pixel, the first pixel and the second pixel respectively including the pixel driving circuit suitable for high pixel density, input ends of the switching transistors in the first pixel and the second pixel are connected to the same data line.

In an embodiment of the disclosure, a first active region is defined between the first gate electrode and the second gate electrode of the switching transistor of the first pixel, and a second active region is defined between the first gate electrode and the second gate electrode of the switching transistor of the second pixel, and the first active region and the second active region include a common portion.

In an embodiment of the disclosure, the pixel driving circuits of the first pixel and the second pixel are horizontally opposed to each other, and the switching transistors of the pixel driving circuit are adjacent to each other.

In an embodiment of the disclosure, each of the first pixel and the second pixel are arranged in a row, the corresponding first pixel and the second pixel corresponding to the first pixel are arranged in a column, the input ends of the switching transistors of the first pixel and the second pixel in the same column are connected to a same data line, and the first gate electrode and the second gate electrode of the switching transistors of the first pixels in the same row or the second pixels in the same row are connected to the same scan line.

The pixel driving circuit further includes a driving transistor and a holding capacitor, a drain electrode of the switching transistor is connected to a gate electrode of the driving transistor, a source electrode of the switching transistor is connected to the data line, and the driving transistor comprises a field effect transistor, a source electrode of the driving transistor is connected to a working voltage, and a drain electrode of the driving transistor is connected to a working ground.

A method for manufacturing a pixel suitable for high pixel density of the present disclosure includes: forming an active layer. The forming the active layer includes: forming a strip-shaped pattern on the active layer, as a common portion pattern of a switching transistor of a pixel driving circuits in adjacent pixels, the strip-shaped patter having a long side and a short side shorter than the long side; and forming a pattern of a dual gate field effect transistor extending toward one side of the strip-shaped pattern along a short side of the strip-shaped pattern at both ends of the strip-shaped pattern, and forming a pattern of another dual gate field effect transistor extending toward the other side of the strip-shaped pattern along the short side of the strip-shaped pattern at both ends of the strip-shaped pattern, patterns are used as patterns in the switching transistors of the pixel driving circuits in the adjacent pixels respectively.

An embodiment of the disclosure further includes: symmetrically forming patterns of the driving transistors in the pixel driving circuits of the adjacent pixels on both sides of the strip-shaped pattern, based on a direction of along side of the strip-shaped pattern.

The method further includes forming a first insulating layer and a first metal layer on the active layer, and forming a pattern of a scan line on the first metal layer, the dual gate field effect transistor including a first gate electrode and a second a gate electrode, the first gate electrode and the second gate electrode are connected to a scan line.

The pixel driving circuit with high pixel density according to the embodiments of the present disclosure, firstly, by means of adopting a dual gate field effect transistor as a switching transistor, avoiding to use an additional compensation circuit to overcome the interference factor, which may cause pixel complexity and affect the improvement of PPI. In the pixel structure suitable for high pixel density, the gates of the switching transistors of two adjacent pixels in the same column are connected in parallel and a part of the semiconductor crystal in the active region is shared, so that the structures of adjacent switching transistors are simplified to reduce the spacing between adjacent switching transistors, and thereby the spacing between adjacent pixels in the same column is reduced, and the pixel density is improved.

BRIEF DESCRIPTION OF DRAWINGS

In order to illustrate technical solutions of embodiments of the present disclosure or the technical solutions in the prior art more clearly, the accompanying drawings required in the embodiments or the descriptions of the prior art will be briefly described below. Obviously, the accompanying drawings in the following descriptions are some embodiments of the present disclosure, and those skilled in the art may obtain other drawings according to the accompanying drawings without creative efforts.

DETAILED DESCRIPTION

In order to render the purposes, technical solutions and advantages of the embodiments of the present disclosure more clearly, the technical solutions of the embodiments of the present disclosure are clearly and completely described in the following with reference to the accompanying drawings of the embodiments of the present disclosure. Obviously, the described embodiments are parts of the embodiments of the disclosure, and not all of the embodiments. Based on the embodiments of the present disclosure, other embodiments obtained by those skilled in the art without creative efforts are within the scope of the present disclosure.

Figure 1:
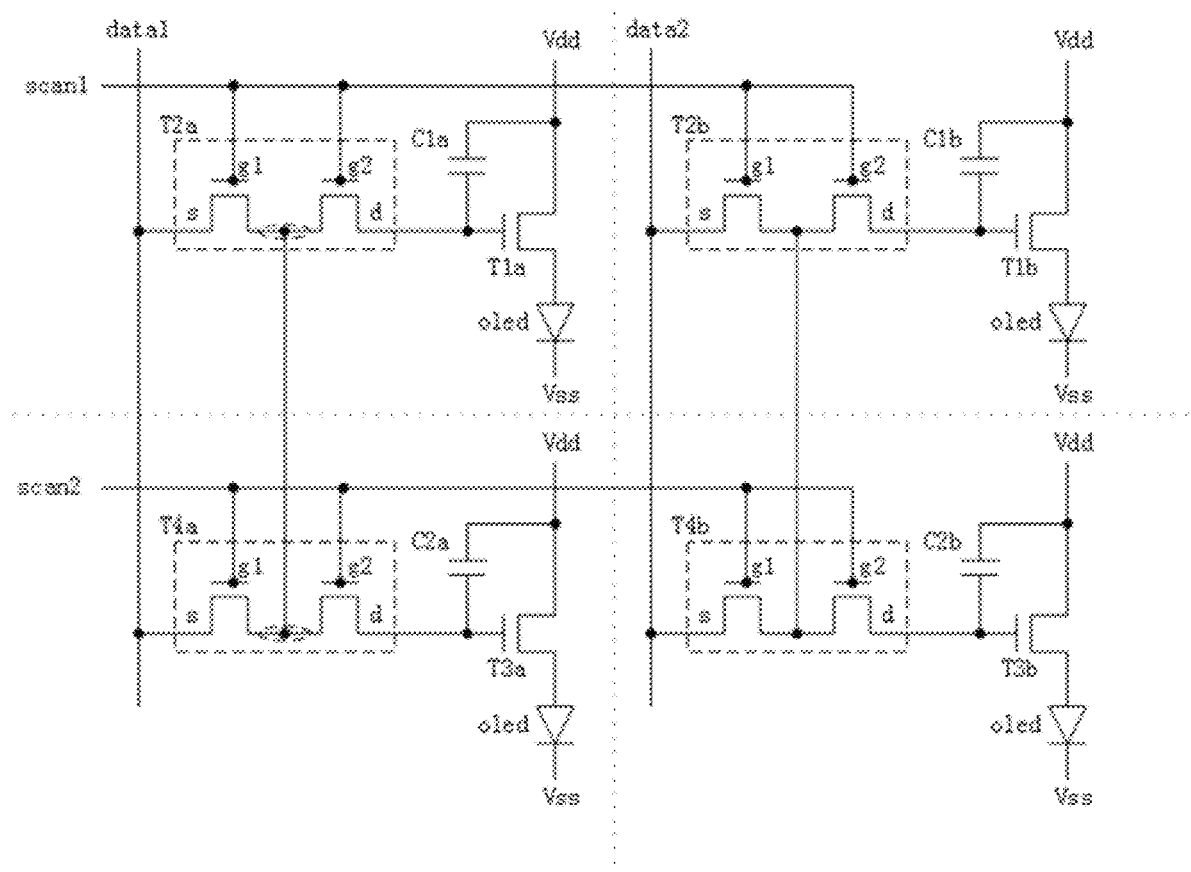
FIG. 1 is a schematic diagram showing an equivalent circuit of a pixel driving circuit suitable for high pixel density according to an embodiment of the present disclosure.

FIG. 1 is a schematic diagram showing an equivalent circuit of a pixel driving circuit suitable for high pixel density according to an embodiment of the present disclosure. As shown in FIG. 1, in an embodiment of the present disclosure, a pixel (or a single sub-pixel) is arranged in a row and a column, and the pixels of each row are connected to a same scan line, and the pixels of each column are connected to a same data line. As shown in FIG. 1, four pixels including an upper left pixel, an upper right pixel, a lower left pixel, and a lower right pixel. The upper left pixel and the upper right pixel, deemed as the first pixels, are connected to the scan line scan1, and the lower left pixel and the lower right pixel, deemed as the second pixels, are connected to the scan line scan2, and the upper left pixel and the lower left pixel, deemed as adjacent first and second pixels, are connected to the data line data1, and the upper right pixel and the lower right pixel, deemed as another adjacent first and second pixels, are connected to the data line data2.

A pixel structure in an embodiment of the present disclosure as shown in FIG. 1 includes a pixel driving circuit and a light emitting diode (for example, an organic light emitting display made of indium tin oxide), and the pixel driving circuit adopts a 2T1C pixel driving circuit, which includes a switching transistor (for example, a Field Effect Transistor (FET)), a driving transistor (for example, a field effect transistor), and a holding capacitor, in which:

The switching transistor is used for controlling data input (such as a digital signal transmitted by a data line) of an input end (such as a source electrode) according to a signal of a scan line connected to a gate electrode;

The driving transistor is used for receiving, with a gate electrode, a signal output (such as a voltage signal) by an output end (such as a drain electrode) of the switching transistor, and forming an operating current for driving the light emitting diode (in combination with a working power source and a working ground);

The holding capacitor is used for maintaining a gate voltage of the driving transistor to form a stable operating current of the driving transistor.

The drain electrode of the switching transistor is connected to the gate electrode of the driving transistor. The gate electrode of the switching transistor is connected to the scan line. The source electrode of the switching transistor is connected to the data line. The light emitting diode is connected in series with the source electrode or the drain electrode of the driving transistor. The holding capacitor is connected between the gate electrode and the source electrode of the driving transistor or between the gate electrode and the drain electrode of the driving transistor, depending on the position of the series connection of the light emitting diode. The source electrode of the driving transistor is connected to a working voltage. The drain electrode of the driving transistor is connected to the working ground. Taking the upper left pixel as an example, a gate electrode of a switching transistor T2a is connected to a scan line scan1, a source electrode of the switching transistor T2a is connected to a data line data1, a drain electrode of the switching transistor T2a is connected to a gate electrode of a driving transistor T1a, a source electrode of the driving transistor T1a is connected to the working voltage Vdd, and a drain electrode of the driving transistor T1a is connected in series with the LED, and then connected to the working ground Vss.

As shown in FIG. 1, switching transistors (for example, switching transistors T2a, T2b, T4a, and T4b) of a pixel driving circuit according to an embodiment of the present disclosure include dual gate FETs, and a first gate electrode and a second gate electrode of a dual gate FET are connected to a same scan line. Taking the upper left pixel as an example, the first gate electrode g1 and the second gate electrode g2 included in the switching transistor T2a are connected to the scan line scan1. The gate electrodes of the switching transistor T2a and the switching transistor T2b in the same row are connected to the same scan line scan1.

In an embodiment of the present disclosure, the first gate electrode g1 and the second gate electrode g2 of the dual gate field effect transistor are of a top gate type. The dual gate FETs adopted by the switching transistors of the pixel driving circuit of the same column of pixels have the same type of gate electrode.

In an embodiment of the present disclosure, the first gate electrode g1 and the second gate electrode g2 of the dual gate field effect transistor are of a bottom gate type. The dual gate FETs adopted by the switching transistors of the pixel driving circuit of the same column of pixels have the same type of gate electrode.

In an embodiment of the present disclosure, the first gate electrode g1 (or the second gate electrode g2) of the dual gate field effect transistor is of a top gate type, and the second gate electrode g2 (or the first gate electrode g1) is of a bottom gate type. The dual gate FETs adopted by the switching transistors of the pixel driving circuit of the same column of pixels have the same type of gate electrode.

As shown in FIG. 1, in one embodiment of the present disclosure, two rows of pixels are deemed as a group, and pixel driving circuits of a same column of pixels in the first row of pixels (the first pixels) and the second row of pixels (the second pixels) are horizontally opposed to each other. A common portion is formed between the first gate electrode and the second gate electrode of switching transistors of the first pixels and the first gate electrode and the second gate electrode of switching transistors of the second pixel. "Horizontally opposed to each other" means that in the pixel driving circuits of the first pixel and the second pixel in the same column, the switching transistor and the driving transistor are located at the same level, and the switching transistor and the driving transistor are symmetrically arranged while the switching transistors are adjacent to each other. Taking the upper left pixel (a first pixel) and the lower left pixel (a second pixel) as an example, the switching transistor T2a in the pixel driving circuit of the upper left pixel and the switching transistor T4a in the pixel driving circuit of the lower left pixel include dual gate FETs, and an active region (a semiconductor of an active layer) between the first gate electrode g1 and the second gate electrode g2 of the switching transistor T2a and an active region (a semiconductor of an active layer) between the first gate electrode g1 and the second gate electrode g2 of the switching transistor T4a form common portions (the elliptical areas in FIG. 1).

Figure 3:
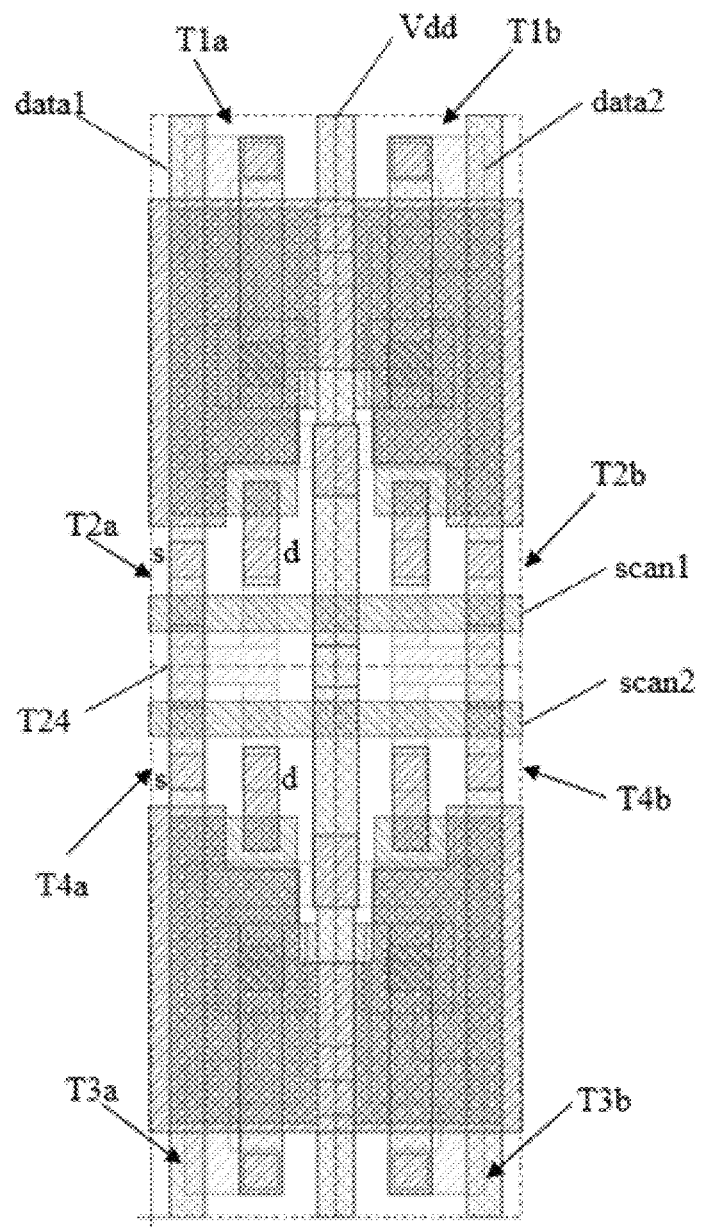
FIG. 3 is a schematic structural diagram of a circuit layout suitable for a pixel structure with high pixel density according to an embodiment of the present disclosure.

FIG. 3 is a schematic structural diagram of a circuit layout suitable for a pixel structure with high pixel density according to an embodiment of the present disclosure. As shown in FIG. 3, taking an upper left pixel (a first pixel) and a lower left pixel (a second pixel) as an example, the semiconductor pattern portions of the gate electrodes of the switching transistor T2a and the switching transistor T4a are overlapped and common used, and the overlapping position forms a strip-shaped pattern T24.

In VR applications, an OLED panel as a close-range display unit requires the arrangement of pixels to be as close as possible and the size of pixel driving circuits to be as small as possible, to increase the aperture ratio of the pixels. However, the increasing of pixel density causes (the area of) the light-emitting device of each pixel to be reduced, which causes the driving current of the light emitting device to be reduced. Meanwhile, the driving transistor of the pixel driving circuit needs to be associated with the working voltage, the working ground and the light emitting device, and the channel length of the driving transistor becomes even longer due to manufacturing level, so the control voltage of the gate electrode of the driving transistor needs to be more precise. However, once the switching transistor of the pixel driving circuit is affected by interference factors such as feedback capacitance, parasitic capacitance and the like of an electron channel, the gate electrode of the driving transistor cannot be stably controlled. If the interference factors are overcome by adding a compensation circuit, it will affect the pixel density and reduce the pixel reliability. The pixel structure with high pixel density in the embodiments of the disclosure firstly uses the dual gate FET as the switching transistor to avoid excessive drain current (i.e., gate-drain current), and parasitic capacitances such as feedback capacitances are effectively overcome, so as to ensure the stability of the gate control current of the driving transistor.

Figure 2:
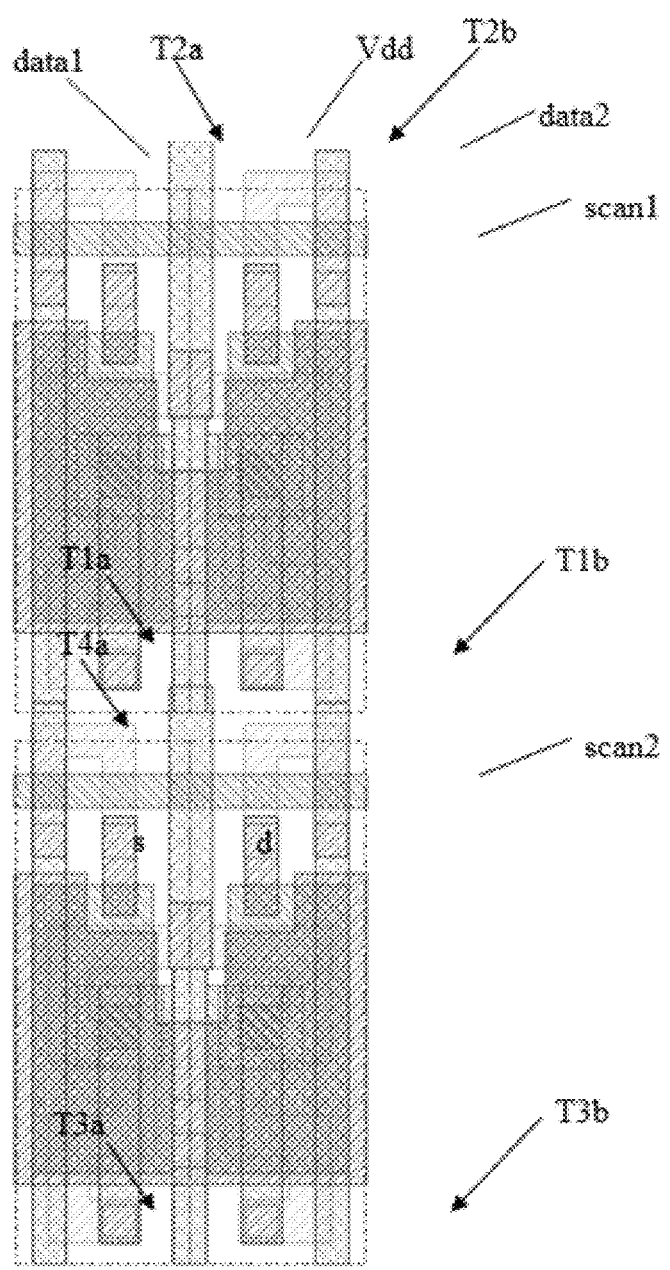
FIG. 2 is a schematic structural diagram of a circuit layout suitable for a pixel structure with high pixel density according to an embodiment of the present disclosure.

FIG. 2 is a schematic structural diagram of a circuit layout suitable for a pixel structure with high pixel density according to an embodiment of the present disclosure. As shown in FIG. 2, taking the pixel driving circuits of an upper left pixel (i.e., a first pixel) and a lower left pixel (i.e., a second pixel) in the same column and adjacent to each other as an example, the switching transistor T2a of the upper left pixel and the switching transistor T4a of the lower left pixel include dual gate FETs. The first gate electrode g1 and the second gate electrode g2 of the switching transistor T2a are connected to the same scan line, scan1, the first gate electrode g1 and the second gate electrode g2 of the switching transistor T4a are connected to the same scan line, scan2, and the source electrodes s of the switching transistor T2a and the switching transistor T4a are connected to the same data line data1. As shown in FIG. 2, the driving transistor T1a of the upper left pixel is adjacent to the switching transistor T4a of the lower left pixel, a pixel pitch between the upper left pixel and the lower left pixel is therefore formed. However, if the switching transistor uses a dual gate structure when the channel length of the driving transistor is longer than 16 μm and the minimum pixel pitch is 35.35 μm, the maximum PPI of pixel scan only be 719, which is unable to meet the requirements of some VR projects.

As shown in FIG. 3, taking the pixel driving circuit of the upper left pixel (i.e., the first pixel) and the lower left pixel (i.e., the second pixel) in the same column and adjacent to each other as an example, the switching transistor T2a of the upper left pixel and the switching transistor T4a of the lower left pixel include dual gate FETs. The first field gate electrode g1 and the second gate electrode g2 of the switching transistor T2a are connected to the same scan line scan1, the first gate electrode g1 and the second gate electrode g2 of the switching transistor T4a are connected to the same scan line scan2, and the source electrodes s of the switching transistor T2a and the switching transistor T4a are connected to the same data line data1. As shown in FIG. 3, the pixel driving circuits of the upper left pixel and the lower left pixel in the same column and adjacent to each other are horizontally opposed to each other, the switching transistor T2a of the upper left pixel and the switching transistor T4a of the lower left pixel are adjacent to each other. Meanwhile, the source electrode pattern and the drain electrode pattern, on the active layer, of the switching transistor T2a and the switching transistor T4a are partially overlapped, and a parallel connection between the source electrodes of the switching transistor T2a and the switching transistor T4a and a parallel connection between the drain electrodes of the switching transistor T2a and the switching transistor T4a are formed, so that the switching transistor is selected by means of the scanning line, and signals are input and output by means of the source electrodes and drain electrodes connected in parallel. The pixel structure with high pixel density of an embodiment of the present disclosure utilizes the partial overlapping of semiconductors of the switching transistors of two adjacent pixels in the same column to form parallel connections of input ends and parallel connections of output ends in each row, thereby simplifying the structures of the adjacent switching transistors to reduce the spacing between adjacent switching transistors. Further, the intervals between adjacent pixels in the same column are reduced, and the pixel density is improved. With the pixel structure with the high pixel density of the embodiments of the disclosure, a dual gate structure being adopted by switching transistors when the channel length of the driving transistor is greater than 16 μm, the pixel spacing may be less than 35.35 μm, and the maximum PPI of pixel scan be made to 810, meeting the requirements of the VR projects.

Referring to the pixel driving circuit shown in FIG. 3, the main difference between the manufacturing method of the pixel structure with high pixel density according to the embodiments of the present disclosure and the conventional pixel manufacturing method lies in the manufacturing method of the adjacent switching transistors in the pixel driving circuits of two adjacent pixels in the same column.

A method for manufacturing a pixel structure with high pixel density according to an embodiment of the present disclosure includes:

forming a strip-shaped pattern T24 on an active layer (i.e., a semiconductor layer) as a common pattern of the dual gate electrodes of the switching transistors in the pixel driving circuits of the adjacent two pixels (i.e., a first pixel and a second pixel) in the same column, the pattern on the active layer usually being formed by a commonly used method such as vapor deposition;

forming a pattern of a switching transistor at both ends of the strip-shaped pattern T24 on the active layer along a short side toward one side of the strip-shaped pattern T24, the pattern of the switching transistor being a pattern of a dual gate field effect transistor;

forming a pattern of another switching transistor at both ends of the strip-shaped pattern T24 on the active layer along the short side toward the other side of the strip-shaped pattern T24, the pattern of the switching transistor being a pattern of a dual gate field effect transistor;

symmetrically forming patterns of the driving transistors in the pixel driving circuits of the two adjacent pixels in the same column on both sides of the strip-shaped pattern T24 on the active layer, based on the direction of the long side of the strip-shaped pattern T24, the pattern on the active layer being usually formed by a commonly used method such as etching.

Through the above pattern, the two switching transistors have a common semiconductor region (i.e., the strip-shaped pattern T24), switching transistors of different pixels are selected by different scanning lines, and the strip-shaped pattern T24 may be applied to corresponding switching transistors. This type of switching transistor pattern simplifies the arrangement structures of the switching transistors in adjacent pixels in the same column, reduces the pattern size, and further reduces the pixel pitch.

The method for manufacturing a pixel structure with high pixel density according to an embodiment of the disclosure further includes:

forming a first insulating layer and a first metal layer on the active layer, and forming the patterns, on the first metal layer, of a gate electrode, a source electrode, and a drain electrode corresponding to the switching transistor and the driving transistor;

forming a pattern of scan lines (scan1, scan2) on the first metal layer, the metal layer being formed by a commonly used method such as vapor deposition, and the metal layer pattern being usually formed by a commonly used method such as wet etching;

forming a second insulating layer and a second metal layer on the first metal layer, forming a contact hole in the second insulating layer, forming a data line (data1, data2) and a power line (Vdd) on the second metal layer, and then completing the connection of a holding capacitor, a power source, and a transparent anode (i.e., the light emitting diode) by way of commonly used manufacturing processes.

The manufacturing method of the pixel structure with high pixel density according to the embodiments of the present disclosure may simplify the fabrication of the (dual gate) switching transistor in the pixel driving circuit of two adjacent pixels, reduce the pixel pitch, and effectively improve the PPI.

The above are only the preferred embodiments of the present disclosure, and are not intended to limit the present disclosure. Any modifications, equivalents, and the like made within the spirit and principles of the present disclosure should be included in the scope of the present disclosure.

What is claimed is:

1. A method for manufacturing a pixel, comprising:
   forming an active layer;
   wherein the forming an active layer comprises:
   forming a strip-shaped pattern on the active layer, as a common portion pattern of a switching transistor of a pixel driving circuit in adjacent pixels, the strip-shaped pattern having a long side and a short side shorter than the long side;
   forming a pattern of a dual gate field effect transistor extending toward one side of the strip-shaped pattern along the short side of the strip-shaped pattern at both ends of the strip-shaped pattern, and forming a pattern of another dual gate field effect transistor extending toward the other side of the strip-shaped pattern along the short side of the strip-shaped pattern at both ends of the strip-shaped pattern, wherein the common portion pattern of switching transistors in each switching transistor of the adjacent pixels is between a first and a second gate of the dual gate field effect transistor and wherein the common portion patterns of the switching transistors of the adjacent pixels are connected to one another, patterns being used as patterns of the switching transistors in the pixel driving circuits of the adjacent pixels respectively.

2. The method according to claim 1, further comprising:
   symmetrically forming patterns of the driving transistors in the pixel driving circuits of the adjacent pixels on both sides of the strip-shaped pattern, based on a direction of along side of the strip-shaped pattern.

3. The method according to claim 1, further comprising:
   forming a first insulating layer and a first metal layer on the active layer, and forming a pattern of a scan line on the first metal layer, wherein the dual gate field effect transistor comprises a first gate electrode and a second gate electrode, and the first gate electrode and the second gate electrode are connected to a scan line.

* * * * *